(12) United States Patent
Singal et al.

(10) Patent No.: US 12,136,274 B2
(45) Date of Patent: Nov. 5, 2024

(54) METHOD AND SYSTEM FOR DETECTING LANE PATTERN

(71) Applicant: HL Klemove Corp., Pyeongtaek (KR)

(72) Inventors: Varsha Singal, Bangalore (IN); Arpit Awasthi, Gurgaon (IN); Jitesh Kumar Singh, Bangalore (IN)

(73) Assignee: HL KLEMOVE CORP., Incheon (KR)

( * ) Notice: Subject to any disclaimer, the term of this patent is extended or adjusted under 35 U.S.C. 154(b) by 472 days.

(21) Appl. No.: 17/530,526

(22) Filed: Nov. 19, 2021

(65) Prior Publication Data

US 2022/0164584 A1 May 26, 2022

(30) Foreign Application Priority Data

Nov. 20, 2020 (IN) .............................. 202041050782

(51) Int. Cl.
*G06V 20/56* (2022.01)
*B60W 30/12* (2020.01)
*G06V 10/50* (2022.01)

(52) U.S. Cl.
CPC ............ *G06V 20/588* (2022.01); *G06V 10/50* (2022.01); *B60W 30/12* (2013.01); *B60W 2420/403* (2013.01); *B60W 2552/53* (2020.02)

(58) Field of Classification Search
CPC ...... G06V 20/588; G06V 10/50; G06V 10/44; G06V 10/82; B60W 30/12; B60W 2420/403; B60W 2552/53; G06T 5/60; G06N 3/0464
See application file for complete search history.

(56) References Cited

U.S. PATENT DOCUMENTS

| 10,997,433 | B2 * | 5/2021 | Xu | .................. G06F 18/24143 |
| 2019/0063945 | A1 | 2/2019 | Liu | |
| 2019/0266418 | A1 | 8/2019 | Xu | |
| 2020/0074190 | A1 * | 3/2020 | Khakharia | ............. G06N 3/045 |

\* cited by examiner

*Primary Examiner* — Bobbak Safaipour
*Assistant Examiner* — Michael Kim Maiden
(74) *Attorney, Agent, or Firm* — Harvest IP Law, LLP

(57) ABSTRACT

The present disclosure is related in general to field of machine learning and image processing, that provides a method and system for detecting lane pattern. A lane classification system receives an input image comprising lane markings and co-ordinates of the lane markings, which is divided into two portions, a first image portion and a second image portion based on the lane markings and the co-ordinates of the lane markings. Further, the first image portion and the second image portion are resized into a predefined template size. The lane classification system detects a lane pattern in the two portions by analysing each of the one or more lane markings located in the resized first image portion and the second image portion, independently, based on historical lane data.

11 Claims, 11 Drawing Sheets

FIG.2B(1)
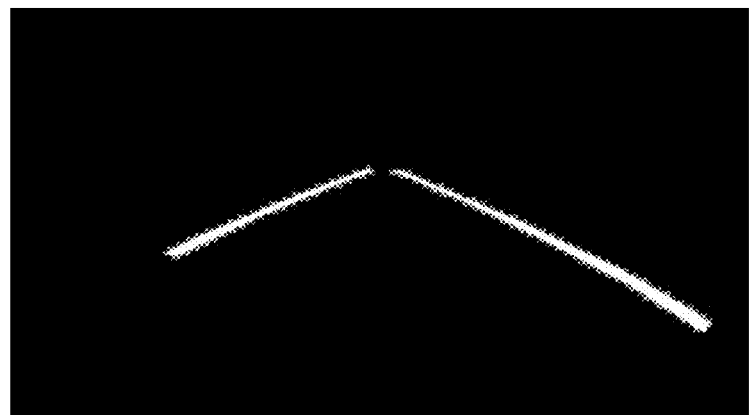
FIG.2B(2)

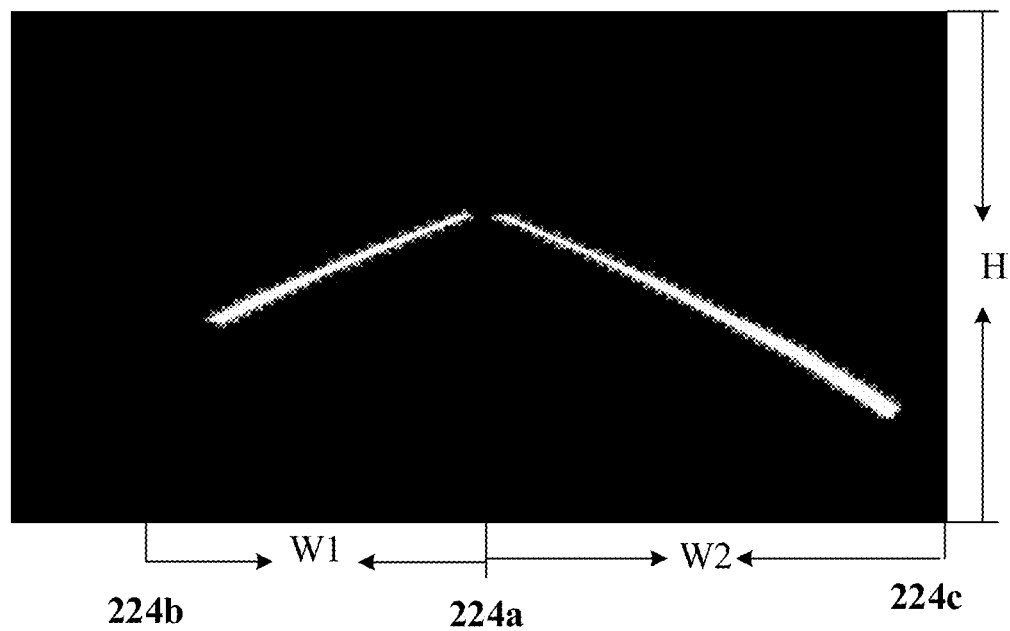
FIG.2C(1)
FIG.2C(2)
FIG.2C(3)

FIG.2D(1)
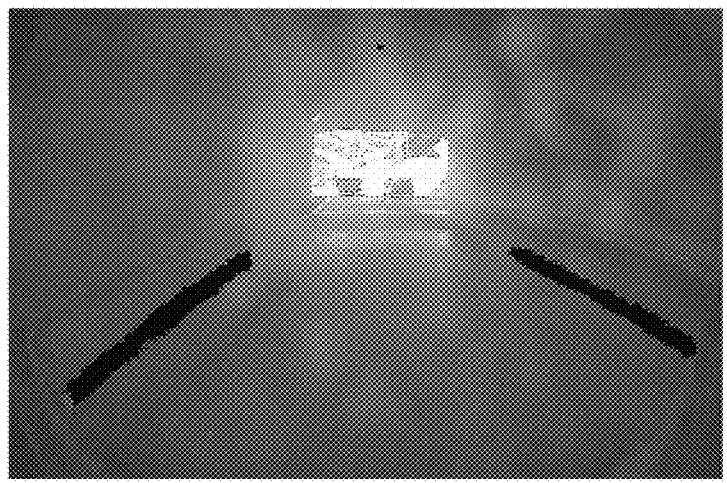
FIG.2D(2)
FIG.2D(3)

FIG.2D(4)
FIG.2D(5)

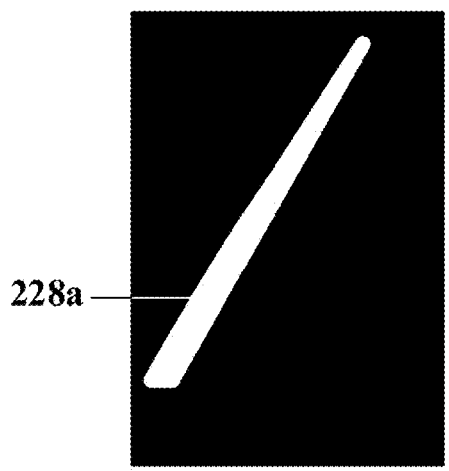
FIG.2E(1)
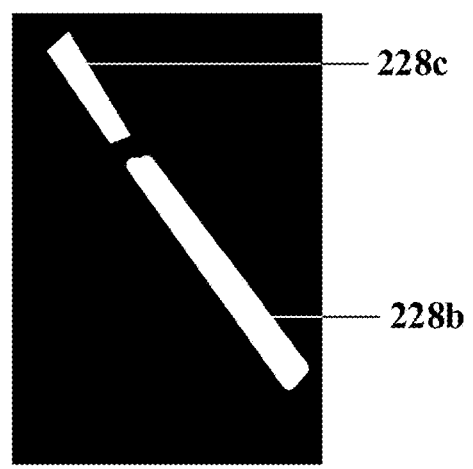
FIG.2E(2)
FIG.2F(1)

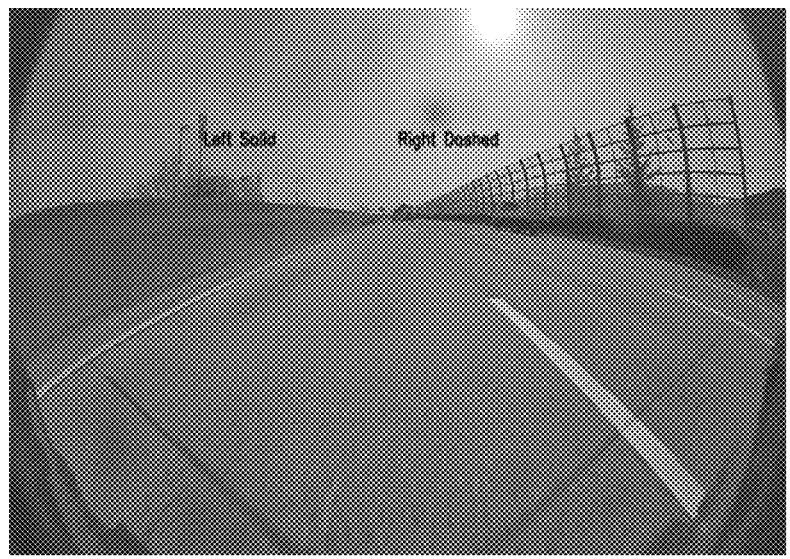
FIG.2F(2)

METHOD AND SYSTEM FOR DETECTING LANE PATTERN

CROSS-REFERENCE TO RELATED APPLICATION

This application claims priority from India Patent Application No. 202041050782, filed on Nov. 20, 2020 in the Intellectual Property India, the disclosure of which is incorporated herein by reference in its entirety.

TECHNICAL FIELD

The present subject matter is related in general to the field of machine learning and image processing, and more particularly, but not exclusively to a method and a system for detecting lane pattern.

BACKGROUND

Nowadays, in urban areas, traffic on road has increased to a large extent. Heavy traffic leads to traffic jams causing stress and fatigue to drivers dealing with such heavy traffic everyday. This has been one of the major trigger for automotive industries to move towards autonomous vehicles. Autonomous vehicles are the vehicles that are capable of sensing environment around them for moving on the road without any human intervention. The autonomous vehicles sense the environment with the help of sensors configured in the autonomous vehicles such as Laser, Light Detection and Ranging (LIDAR), Global Positioning System (GPS), computer vision and the like. However, for an autonomous vehicle to navigate smoothly on the road, one of the main requirements is lane detection in real-time, based on image capturing devices configured on the autonomous vehicle. The lane detection may include detecting lane markings on the road, colour of lane markings, pattern of lane markings and the like, based on which the autonomous vehicle may be directed on the road.

The existing techniques disclose heuristics, which are followed by post-processing techniques to identify lane segments. However, such heuristics and post-processing techniques are not only expensive, but also fail to identify lane segments when variations in road scene occurs. Further, a few other existing techniques disclose deep learning based lane detection. However, the deep learning based lane detection techniques may have an arrangement of numerous neural network layers, thereby rendering the deep learning based techniques complex and expensive. Further, the existing lane detection techniques may identify lane segments even when the lane markings are not present on the road, thereby leading to false detections.

Therefore, there is need for a deep learning based technique which is less complex and used for performing lane detection with accuracy.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method of detecting lane pattern. The method includes receiving, by a processor communicatively connected to an image sensor mounted to a host vehicle, an input image from a data source. The input image is a Ground Truth (GT) image comprising one or more lane markings and co-ordinates of the one or more lane markings. Further, the input image is captured by the image sensor. Further, the method includes dividing the input image into two portions, a first image portion and a second image portion. The first image portion is divided based on the one or more lane markings and the co-ordinates of the one or more lane markings located on left side of the input image and the second image portion is divided based on the one or more lane markings and the co-ordinates of the one or more lane markings located on right side of the input image. Upon dividing the input image into two portions, the method includes resizing the first image portion and the second image portion into a predefined template size. Finally, the method includes detecting a lane pattern in at least one of the two portions by analysing each of the one or more lane markings located in the resized first image portion and the second image portion, independently, based on historical lane data.

Further, the present disclosure comprises a lane classification system for detecting lane pattern. The lane classification system comprises an image sensor mounted to a host vehicle, to capture images of an area in front of the host vehicle. Further, the lane classification system comprises a processor communicatively connected to the image sensor and configured to receive an input image from a data source. The input image is a Ground Truth (GT) image comprising one or more lane markings and co-ordinates of the one or more lane markings. Further, the input image is captured by an image sensor captured on a host vehicle. Further, the processor divides the input image into two portions, a first image portion and a second image portion. The first image portion is divided based on the one or more lane markings and the co-ordinates of the one or more lane markings located on left side of the input image and the second image portion is divided based on the one or more lane markings and the co-ordinates of the one or more lane markings located on right side of the input image. Upon dividing the input image into two portions, the processor resizes the first image portion and the second image portion into a predefined template size. Finally, the processor detects a lane pattern in at least one of the two portions by analysing each of the one or more lane markings located in the resized first image portion and the second image portion, independently, based on historical lane data.

Furthermore, the present disclosure comprises an Advanced Driver-Assistance System (ADAS) comprising a lane classification system, a display device, and a vehicle controlling system. The lane classification system comprising an image sensor mounted to a host vehicle, to capture images of an area in front of the host vehicle. Further, the lane classification system comprises a processor communicatively connected to the image sensor and configured to receive an input image from a data source. The input image is a Ground Truth (GT) image comprising one or more lane markings and co-ordinates of the one or more lane markings, wherein the input image is captured by the image sensor. Further, the processor divides the input image into two portions, a first image portion and a second image portion. The first image portion is divided based on the one or more lane markings and the co-ordinates of the one or more lane markings located on left side of the input image and the second image portion is divided based on the one or more lane markings and the co-ordinates of the one or more lane markings located on right side of the input image. Thereafter, the processor resizes the first image portion and the second image portion into a predefined template size. Finally, the processor detects a lane pattern in at least one of the two portions by analysing each of the one or more lane markings located in the resized first image portion and the second image portion, independently, based on historical lane data. Further, the display device associated with the lane classification system is configured to display the detected lane pattern. Furthermore, the vehicle controlling system associated with the lane classification system and the display device is configured to control navigation of the host vehicle, in real-time, based on the detected lane pattern displayed on the display device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 2A:
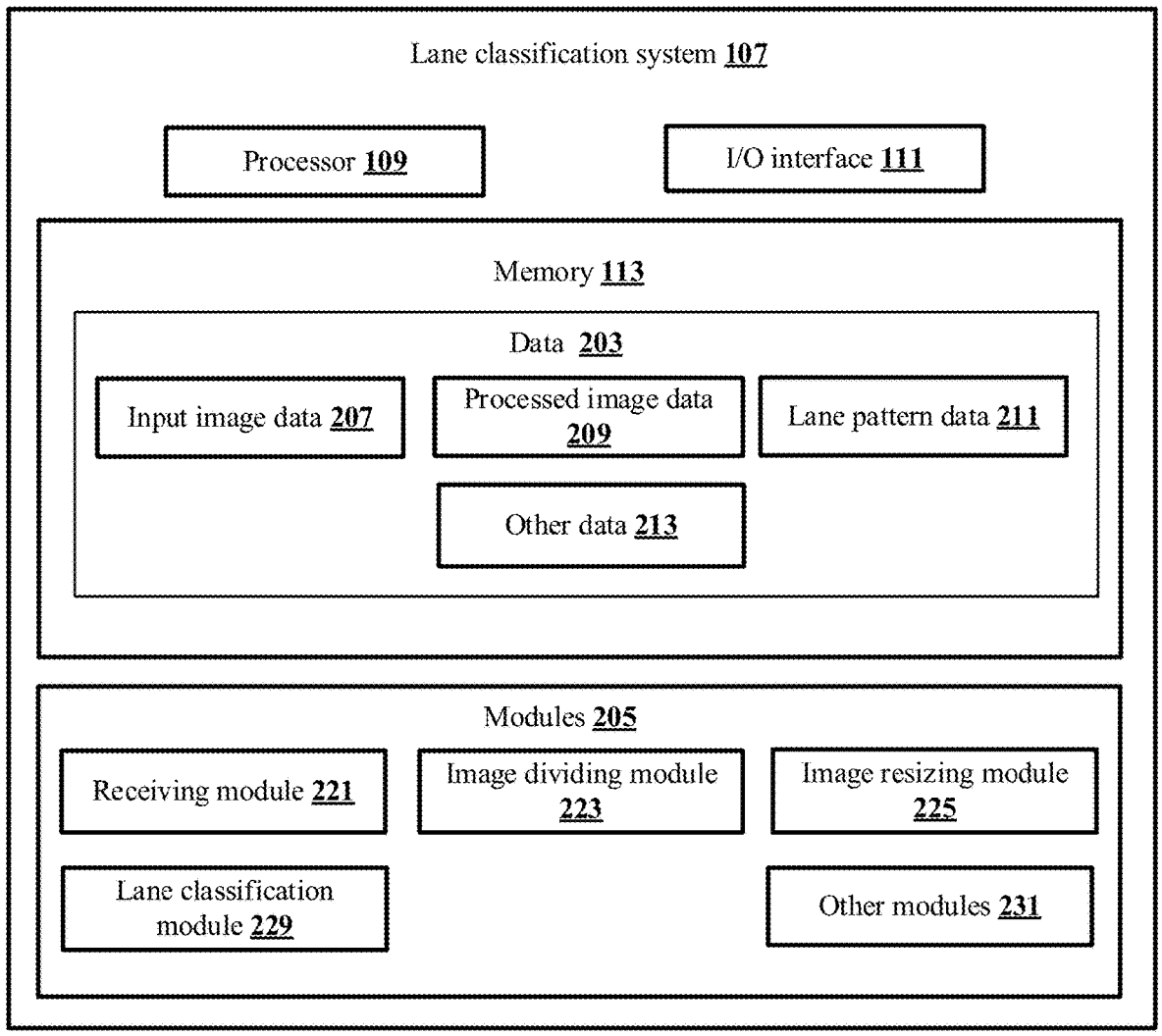
FIG. 2A shows a detailed block diagram of a lane classification system for detecting lane pattern in accordance with some embodiments of the present disclosure.
Figure 2G:
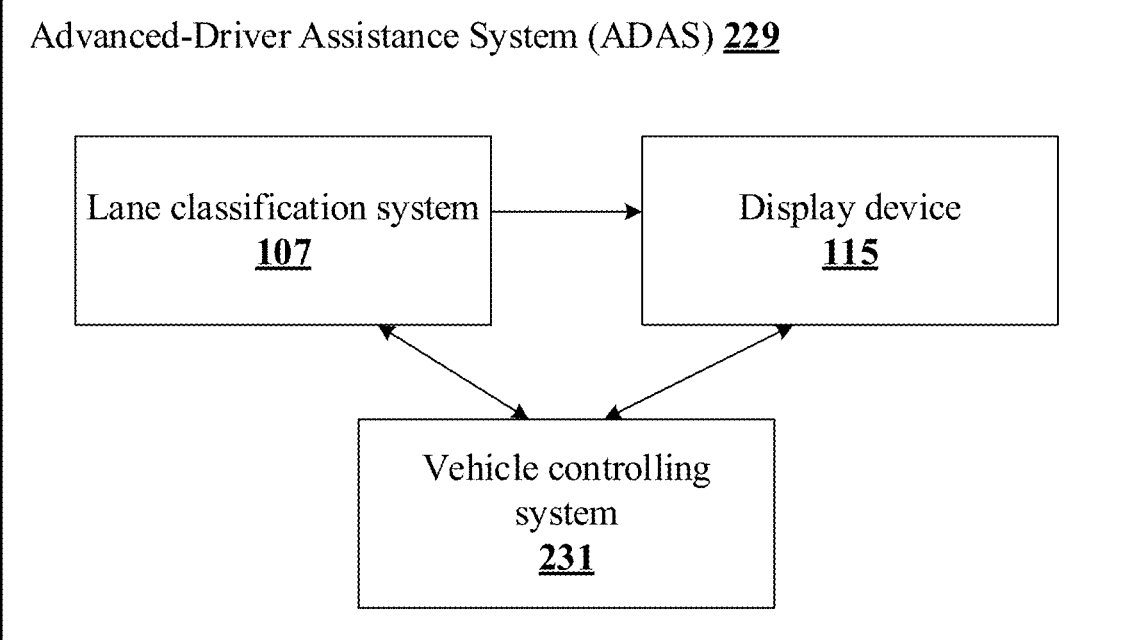
Figure 3:
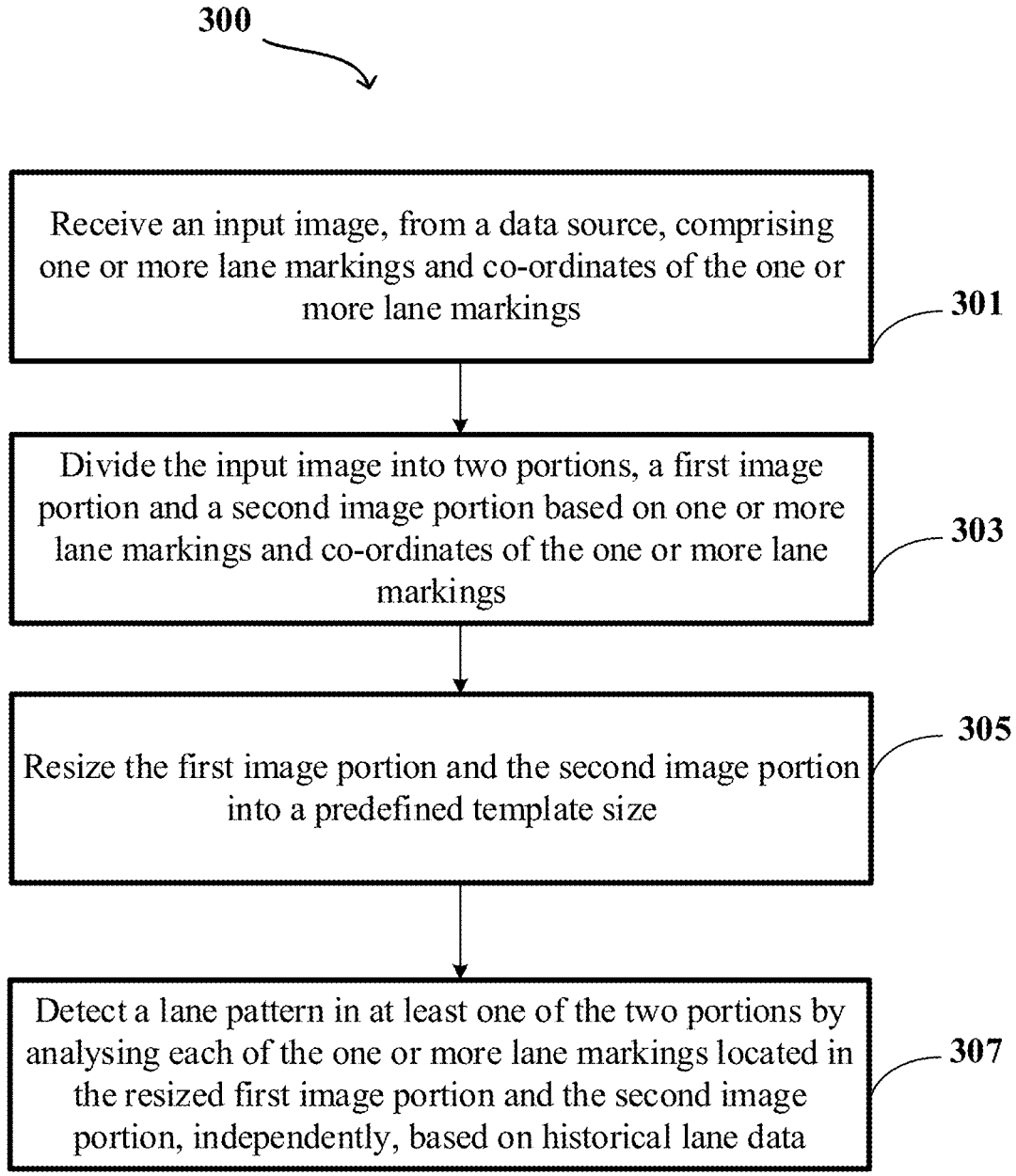
Figure 4:
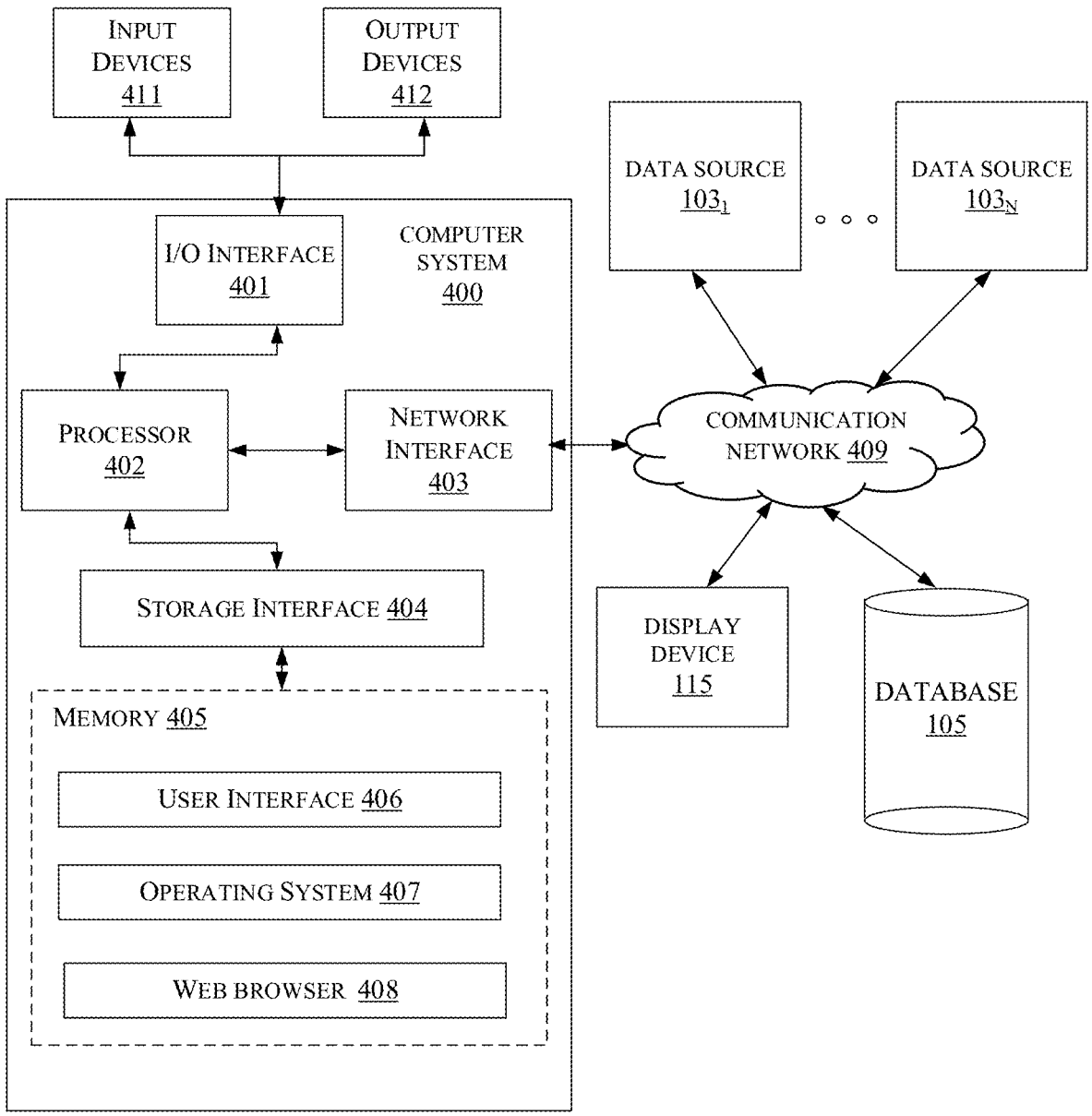

FIG. 2B(1) and FIG. 2B(2) shows an exemplary original image and a corresponding Ground Truth (GT) image, respectively, in accordance with some embodiments of the present disclosure;

FIG. 2C(1) shows exemplary dimensions for dividing an exemplary GT image in accordance with some embodiments of the present disclosure;

FIG. 2C(2) and FIG. 2C(3) show exemplary first image portion and second image portion in accordance with some embodiments of the present disclosure;

FIG. 2D(1)-FIG. 2D(5) show exemplary training images in accordance with some embodiments of the present disclosure;

FIG. 2E(1) and FIG. 2E(2) show exemplary resized first image portion and resized second image portion in accordance with some embodiments of the present disclosure;

FIG. 2F(1) shows an exemplary original image indicating a solid lane and a dashed lane overlaid on lane markings in accordance with some embodiments of the present disclosure;

FIG. 2F(2) shows an exemplary original image indicating textual way of representing a lane pattern in accordance with some embodiments of the present disclosure;

FIG. 2G shows an exemplary Advanced-Driver Assistance System (ADAS) in accordance with some embodiments of the present disclosure;

FIG. 3 shows a flowchart illustrating a method of detecting lane pattern in accordance with some embodiments of the present disclosure; and FIG. 4 is a block diagram of an exemplary computer system for implementing embodiments consistent with the present disclosure.

It should be appreciated by those skilled in the art that any block diagram herein represent conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for detecting lane pattern. A lane classification system may receive an input image from a data source. The input image is a Ground Truth (GT) image comprising one or more lane markings and co-ordinates of the one or more lane markings. In some embodiments, the GT image may be generated from an original image using a feature extraction and prediction model. Upon receiving the GT image, the lane classification system may divide the input image into two portions, a first image portion and a second image portion. In some embodiments, the first image portion is divided based on the one or more lane markings and the co-ordinates of the one or more lane markings located on left side of the input image and the second image portion is divided based on the one or more lane markings and the co-ordinates of the one or more lane markings located on right side of the input image. Upon dividing the input image into two portions, the A lane classification system may resize the first image portion and the second image portion into a predefined template size. Subsequently, the lane classification system may detect a lane pattern in at least one of the two portions by analysing each of the one or more lane markings located in the resized first image portion and the second image portion, independently, based on historical lane data. In some embodiments, the historical lane data may be stored in a database associated with the lane classification system.

The present disclosure uses a regression based deep learning technique for lane detection and classification, which is robust and scalable to varying road conditions, noise conditions and light conditions. The network used by the deep learning technique is a simple network which uses minimum number of layers and parameters for lane detection and classification, thereby enabling easy porting on board. Further, the present disclosure discloses dividing the input image into two portions and analysing each portion independently for lane classification i.e. for detecting lane patterns. This approach reduces analysis time and complexity since the full image is not passed and only the part of the image which includes the region on interest (detected lane markings) is fed for analysis. If the complete image was fed for analysis, the deep learning technique consumes a lot of time to understand various combinations of lane patterns which may be present on left side and right side of the host vehicle. As an example, the various combinations could be solid-solid, dashed-dashed, solid-dashed, dashed-solid and the like. More the number of lane patterns, more number of combinations the deep learning technique has to deal with. Since, the present disclosure is dividing the input image and feeding the image portions independently, which contains only one type of lane pattern in one image portion, the present disclosure is able to eliminate the time and processing complexity involved in dealing with wide range of combinations of lane patterns. Further, since the present disclosure is using a simplified network and uses only few parameters for analysis, the present disclosure is able to not only increase speed of the lane detection and classification but is also able to provide accurate results, at less computational cost.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
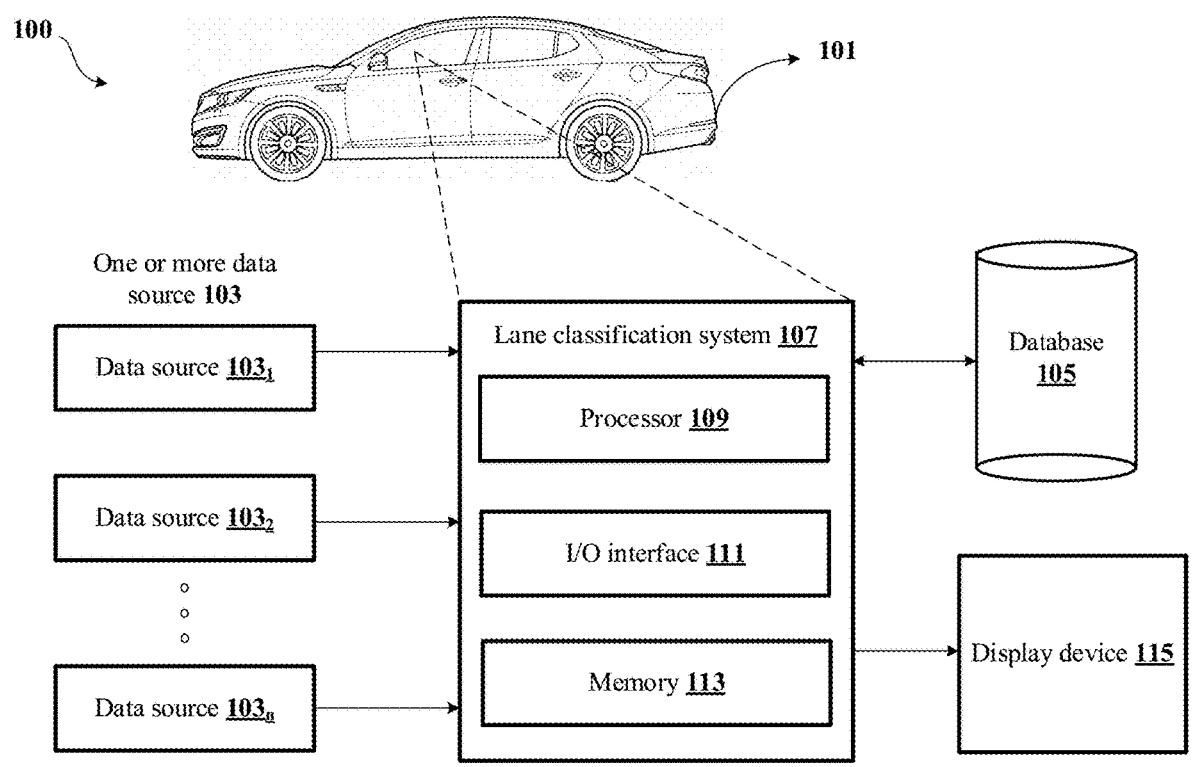
FIG. 1 shows an exemplary architecture for detecting lane pattern in accordance with some embodiments of the present disclosure.

FIG. 1 shows an exemplary architecture for detecting lane pattern in accordance with some embodiments of the present disclosure.

The architecture 100 comprises a host vehicle 101, data source $103_1$ to data source $103_n$ (also referred as one or more data sources 103), a database 105 and a lane classification system 107 and a display device 115. As an example, the host vehicle 101 may be a car, a truck, a bus, and the like. In some embodiments, the one or more data sources 103 may provide input images captured by an image sensor mounted to the host vehicle 101, to the lane classification system 107. As an example, the one or more data sources 103 may include, but not limited to, the image sensor mounted to the host vehicle 101, an image repository or a computing device such as a mobile, a desktop, a laptop and the like associated with the image sensor. As an example, the image sensors may include, but not limited to, a camera. In some embodiments, one or more image sensors may be mounted at different positions on the host vehicle 101. In some embodiments, each of the one or more data sources 103 may be associated with the lane classification system 107 via a communication network. In some embodiments, the communication network may be at least one of a wired communication network and a wireless communication network. The lane classification system 107 may be hosted on a server. In some embodiments, the server in which the lane classification system 107 is hosted may be a local server configured in the host vehicle 101 as shown in the FIG. 1. In some other embodiments, the server in which the lane classification system 107 is hosted may be a remote server or a cloud server. Further, in some embodiments, the lane classification system 107 may be implemented as part of Advanced Driver-Assistance Systems (ADAS).

Further, the lane classification system 107 may include a processor 109, an Input/Output (I/O) interface 111, a memory 113 and an image sensor (not shown in FIG. 1). In some embodiments, the processor 109 may refer to an image processor and a microprocessor or a microcontroller performing their respective functionalities as explained below in the present disclosure. The I/O interface 111 may receive an input image from a data source 103 among the one or more data sources 103. In some embodiments, the input image may be captured by the image sensor mounted to capture front view from the host vehicle 101. In some embodiments, the input image may be a Ground Truth (GT) image comprising one or more lane markings and co-ordinates of the one or more lane markings. The input image received through the I/O interface 111 may be stored in the memory 113. In some embodiments, the image processor may directly process image signals of the input image received from the image sensor mounted to the host vehicle 101, before storing the input image in the memory 113. In some other embodiments, the image processor may process the input image, upon receiving the input image from the data source 103, and then store the processed input image in the memory 113. As an example, processing the input image may include functionalities such as noise reduction, enhancing resolution, suppressing blurriness and vibrations, and the like. In some embodiments, rest of the actions performed on the input image upon performing the initial image processing, are performed by the microprocessor or the microcontroller, which is a part of the processor 109. Further, the I/O interface 111 may access historical lane data stored in the database 105 associated with the lane classification system 107. As an example, the historical lane data may include, but not limited to, lane patterns detected from previous images of lanes captured in real-time by the image sensor. In some embodiments, the database 105 may further include, but not limited to, training images of the lanes captured in different weather conditions and light conditions, and other related image parameters. Further, the microprocessor may divide the input image into two portions i.e. a first image portion and a second image portion. In some embodiments, the microprocessor may divide the first image portion based on the one or more lane markings and the co-ordinates of the one or more lane markings located on left side of the input image and the second image portion based on the one or more lane markings and the co-ordinates of the one or more lane markings located on right side of the input image. Subsequently, the microprocessor may detect lane pattern in at least one of the two portions of the input image based on the historical lane data, using a trained machine learning model. As an example, the trained machine learning model may detect the lane pattern under various conditions such as noisy conditions occurring due to presence of dust/water on the image sensor, due to rain and the like, varying illumination conditions due to shadows of surrounding objects, tunnels, weather conditions and the like. Further, in some embodiments, the detected lane pattern may be displayed using the display device 115 associated with the lane classification system 107. In some embodiments, the detected lane pattern may be displayed on an original image, from which the GT image was generated. As an example, consider the detected lane pattern is a solid lane. The microprocessor may display a phrase "solid lane" on the corresponding lane in the original image.

FIG. 2A shows a detailed block diagram of a lane classification system to detect lane pattern in accordance with some embodiments of the present disclosure.

In some implementations, the lane classification system 107 may include data 203 and modules 205. As an example, the data 203 may be stored in a memory 113 configured in the lane classification system 107 as shown in the FIG. 2A. In one embodiment, the data 203 may include input image data 207, processed image data 209, lane pattern data 211 and other data 213. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 213 may store data, including temporary data and temporary files, generated by the modules 205 for performing the various functions of the lane classification system 107.

In some embodiments, the data 203 stored in the memory 113 may be processed by the modules 205 of the lane classification system 107. The modules 205 may be stored within the memory 113. In an example, the modules 205 communicatively coupled to the processor 109 configured in the lane classification system 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, an image dividing module 223, an image resizing module 225, a lane classification module 227 and other modules 229. The other modules 229 may be used to perform various miscellaneous functionalities of the lane classification system 107. It will be appreciated that such aforementioned modules 205 may be represented as a single module or a combination of different modules.

In some embodiments, the receiving module 221 may receive an input image from a data source 103 among one or more data sources 103. The input image thus received from the data source 103 may be stored as the input image data 207.

In some embodiments, the one or more data sources 103 may provide input images captured by an image sensor mounted to the host vehicle 101, to the lane classification system 107. As an example, the one or more data sources 103 may include, but not limited to, the image sensor mounted to the host vehicle 101, an image repository or a computing device such as a mobile, a desktop, a laptop and the like associated with the image sensor. As an example, the image sensor may include, but not limited to, a camera. As an example, the camera may be a fisheye camera which provides a wider Field of View (FOV).

In some embodiments, the input image may be a Ground Truth (GT) image comprising one or more lane markings and co-ordinates of the one or more lane markings. The GT image may be generated from an original image captured by the image sensor. In some embodiments, the original image may be an RGB image that may include scene covered in the FOV of the image sensor mounted to capture front view from the host vehicle 101. An exemplary original image and a corresponding GT image are as shown in FIG. 2B(1) and FIG. 2B(2) respectively. In some embodiments, the original image may be transformed into a GT image using a feature extraction and prediction model. In some embodiments, the feature extraction and prediction model may be configured in the lane classification system 107. In such scenarios, the receiving module 221 may receive the original image which is an RGB image and thereafter, the lane classification system 107 may transform the original image into the GT image. In some other embodiments, the feature extraction and prediction model may be configured in the computing device associated with the lane classification system 107. In yet other embodiments, the feature extraction and prediction model may be configured in the image sensor capturing the original image. In few other embodiments, the lane classification system 107 may be associated with a remote server or a cloud server configured with the feature extraction and prediction model to transform the original image into the GT image. In the latter scenarios where the feature extraction and prediction model is located external to the lane classification system 107, the receiving module 221 may directly receive the GT image.

In some embodiments, the feature extraction and prediction model may be a Convolutional Neural Network (CNN) model which is pre-trained based on training images. The feature extraction may include, but not limited to, performing edge detection and determining intensity variation. In some embodiments, performing edge detection may include detecting discontinuities in brightness, thereby determining boundaries of objects within the original image. Further, determining intensity variation of pixels in the original image may help in detecting parts of the road which may have lanes. As an example, consider colour of the lane in the original image is white and colour of the road in the original image is black. In such scenarios, the intensity of pixels in parts of the image comprising the lanes would be more when compared to the intensity of pixels in parts of the image comprising the road. Therefore, based on edge detection and intensity variation, the one or more lane markings and the co-ordinates of the one or more lane markings may be determined in the original image. Upon determining the one or more lane markings and the co-ordinates of the one or more lane markings, the original image may be converted into a binary image, wherein every object in the original image excluding the one or more lane markings may be in black colour. The binary image thus obtained from the original image, indicating only the one or more lane markings, is the GT image which is provided as input to the lane classification system 107.

In some embodiments, the image dividing module 223 may be configured to divide the input image i.e. the GT image into two portions. In one embodiment, the two portions of the input image may be a first image portion and a second image portion. In another embodiment, the two portions of the input image may be referred as left image portion and right image portion. In some embodiments, the first portion of the input image may be divided based on the one or more lane markings and the co-ordinates of the one or more lane markings located on left side of the input image. As an example, the left side of the input image may be part of the input image which is to the left from centre point of the input image. In some embodiments, the second image portion may be divided based on the one or more lane markings and the co-ordinates of the one or more lane markings located on right side of the input image. As an example, the right side of the input image may be part of the input image which is to the right from centre point of the input image.

In some embodiments, the image dividing module 223 may select width of the first image portion such that the one or more lane markings present on the left side of the input image are completely covered. Similarly, the image dividing module 223 may select width of the second image portion such that the one or more lane markings present on the right side of the input image are completely covered. Further, height of the first image portion and the second image portion may be equal to complete height of the input image. FIG. 2C(1) shows an exemplary width and height for dividing an exemplary GT image. As shown in the FIG. 2C(1), point 224a indicates a point of the exemplary GT image where the image can be divided in to two portions. Post division, portion to left of the point 224a is the left side of the exemplary GT image and portion to right of the point 224a is the right side of the exemplary GT image. Point 224a to point 224b covers the lane marking on the left side of the exemplary GT image. Therefore, distance between the point 224a to point 224b may be considered as width (W1) of the first image portion. Similarly, point 224a to point 224c covers the lane marking on the right side of the exemplary GT image. Therefore, distance between the point 224a to point 224c may be considered as width (W2) of the second image portion. Further, distance 'H' may be considered as height of the first image portion and the second image portion. Based on the selected height and width of the exemplary GT image, the exemplary first image portion and the exemplary second image portion generated by the image dividing module 223 are as shown in the FIG. 2C(2) and FIG. 2C(3) respectively.

Further, the image resizing module 225 may resize the first image portion and the second image portion into a predefined template size. Resizing the first image portion and the second image portion may help in far region detection because of low resolution and may also help in reducing computation time for classifying the lanes. As an example, the predefined template size may be $\frac{1}{4}^{th}$ of original size/resolution of the left image portion and the right image portion. In some other embodiments, the input image received by the receiving module 221 may itself be resized and thereafter, the first image portion and second image portion may be generated from the resized input image. The first image portion and the second image portion of the input image before and after resizing may be stored as the processed image data 209.

Upon resizing the left image portion and the right image portion, the lane classification module 227 may detect a lane pattern in the two portions of the input image. In some embodiments, the lane classification module 227 may detect the lane pattern using a trained machine learning model to detect the lane patterns. An input to the machine learning model, during training phase, may be RGB images (also referred as training images) capturing road and the surrounding scene. In some embodiments, the RGB images may capture the road and the surrounding scene in noisy conditions and varying light conditions. As an example, the noisy conditions may include, but not limited to, presence of dust/water on the image sensor, presence of patches on the road, weather conditions such as rain and the like. As an example, the varying illumination conditions may occur due to, but not limited to, shadows of surrounding objects, tunnels and the like. FIG. 2D(1) to FIG. 2D(5) show few exemplary training images captured under noisy and varying illumination conditions as indicated in the below Table 1.

TABLE 1

| FIG. No | Presence of Noisy condition | Presence of light condition |
|---|---|---|
| FIG.2D(1) | Rain/Water deposited on the image sensor | — |
| FIG.2D(2) | Dust deposited on the image sensor | Passing through a tunnel |
| FIG.2D(3) | — | Shadow of trees present adjacent to the road |
| FIG.2D(4) (Clear picture) | — | — |
| FIG.2D(5) | Colored patch on the road | — |

By providing the training images as input, the machine learning model may be trained to identify lane patterns even in the presence of the noisy conditions and the varying illumination conditions. In some embodiments, the training images and other related image parameters of the training images may be stored in a database 105 associated with the lane classification system 107. In some embodiments, the machine learning model may be trained to detect lane pattern of the lane on left side of the host vehicle 101 and lane pattern of the lane on right side of the host vehicle 101 separately. Therefore, the training images are divided into two portions i.e. the left portion and right portion and may be fed separately to train the machine learning model. In some embodiments, the lane pattern on left side of the host vehicle 101 and the lane pattern on right side of the host vehicle 101 may be different, due to which the detection of the lane patterns on either side of the host vehicle 101 is performed separately by using the left portion and the right portion of the training images separately.

Further, using the trained machine learning model, the lane classification module 227 may analyse each of the one or more lane markings located in the resized first image portion and the second image portion, independently, based on a historical lane data stored in the database 105. In some embodiments, the historical lane data may include, but not limited to, lane patterns detected from previous images of lanes captured in real-time by the image sensor. In some embodiments, the previous images of lanes may refer to each image that was captured in real-time and analysed prior to current image captured in real-time.

Based on the analysis of the one or more lane markings in each of the resized first image portion and the resized second image portion, the lane classification module 227 may detect the lane pattern. The lane pattern thus detected may be stored as the lane pattern data 211. In some embodiments, the lane classification module 227 may determine a binary value corresponding to each of the one or more lane markings located in the first image portion and the second image portion using the trained machine learning model. Further, the lane classification module 227 may detect the lane pattern based on the binary value determined for each of the one or more lane markings. As an example, when the binary value of the one or more lane markings is determined to be "1", the lane classification module 227 may detect the lane pattern to be "dashed lane". As an example, when the binary value of the one or more lane markings is determined to be "0", the lane classification module 227 may detect the lane pattern to be "solid lane".

In some embodiments, the trained machine learning model may determine the binary value corresponding to the one or more lane markings by parsing each of the one or more pixels corresponding to the one or more lane markings in each of the resized first image portion and the resized second image portion. As an example, if the trained machine learning model detects discrete spaces between the one or more lane markings upon parsing each of the one or more pixels, then the lane classification module 227 may determine the binary value corresponding to the one or more lane markings as "1". Based on the binary value, the lane classification module 227 may detect the lane pattern as "dashed lane". Similarly, if the trained machine learning model detects that the one or more pixels corresponding to the lane markings are continuous without any discrete spaces, then the lane classification module 227 may determine the binary value corresponding to the one or more lane markings as "0". Based on the binary value, the lane classification module 227 may detect the lane pattern as "solid lane". The present disclosure is explained by considering example of solid and dashed lane patterns. However, this should not be construed as a limitation, as the present disclosure can be used to detect different lane patterns other than solid and dashed lane patterns as well.

As an example, consider exemplary resized first image portion and resized second image portion as shown in FIG. 2E(1) and FIG. 2E(2) respectively. Since, each of the one or more pixels of the lane marking 228a in the resized first image portion are continuous, the binary value corresponding to the lane marking 228a is determined to be "0". Therefore, the lane classification module 227 detects the lane pattern of the lane marking 228a as "solid lane". Further, since, each of the one or more pixels of the lane markings 228b and 228c in the resized second image portion have discrete spaces between the one or more pixels, the binary value corresponding to the lane markings 228b and 228c is determined to be "1". Therefore, the lane classification module 227 detects the lane pattern of the lane markings 228b and 228c as "dashed lane".

Further, in some embodiments, along with parsing each of the one or more pixels of the resized first image portion and the second image portion, the analysis based on the historical lane data may further include assigning weightage. The trained machine learning model may assign a weightage to the resized first image portion and the second image portion based on weightage assigned to average outcome of previously analysed images of lanes, stored in the database 105. As an example, consider the weightage assigned to 10 previous images contributed to an inference that the lane pattern is a "solid lane". However, due to some noisy conditions, consider the weightage assigned to the current trial image contributes to an inference that the lane pattern is a "dashed lane". In such scenarios, the lane classification module 227 may confirm the correctness of the inference based on the weightage assigned to the average outcome of previously analysed trial images, for example, weightage assigned to the average outcome of the 10 previous images. When the weightage assigned to the average outcome of the 10 previous images infers that the lane pattern is "solid lane", then the inference of the current image may be considered to be erroneous. The weightage thus assigned may help in reducing the probability of false detection of the lane pattern. However, consider another scenario, where the lane pattern is a "dashed lane". In some embodiments, dashed lane is a solid lane with equal or unequal gaps between the solid lane. Consider that the past 10 frames contributed to an inference that the lane pattern is a "solid lane". Consider the current frame is captured at the onset of the gap in the solid lane. In this case, the gap is not noise but the gap which forms a dashed lane. In such scenarios, consider the weightage assigned to the current frame infers that the lane pattern is "dashed lane". However, when the weightage of the current frame is compared with weightage of average outcome of the past 10 frames, since the past 10 frames infer that the lane pattern is a "solid lane", the lane classification module 227 may consider that the inference of the current frame is incorrect. However, when the lane classification module 227 continues this process for next 10 consecutive frames, the weightage of each of the next 10 consecutive frames may infer that the lane pattern is "dashed lane" due to the occurrence of the gap. In such scenarios, yet again based on the average outcome of the previous frames, the lane classification module 227 learns that, the lane is pattern is actually a "dashed lane" and the gap between the lane is not noise but the gap forming the dashed lane, thereby eliminating false detection of lane pattern.

Further, in some embodiments, the processor 109 may provide the detected lane pattern to a display device 115 associated with the lane classification system 107. The display device 115 may display the detected lane pattern on a display device 115 associated with the lane classification system 107. In some embodiments, the detected lane pattern may be displayed/overlaid on the original image, from which the GT image provided as the input image to the lane classification system 107, was generated. In some other embodiments, the lane pattern may be indicated in words on the corresponding lane in the original image. As an example, consider the detected lane pattern is a solid lane. The processor 109 may display a phrase "solid lane" on the corresponding lane in the original image. FIG. 2F(1) shows an exemplary image indicating a solid lane and a dashed lane overlaid on the original image. FIG. 2F(2) shows an exemplary image indicating the phrase "left solid" for the solid lane pattern and "right dashed" for the dashed lane pattern.

FIG. 2G shows an exemplary Advanced Driver-Assistance System (ADAS) 229, that may include, the lane classification system 107, the display device 115, and a vehicle controlling system 231. The display device 115 associated with the lane classification system 107 may display the detected lane pattern. In some embodiments, the vehicle controlling system 231 associated with the lane classification system 107 and the display device 115 may be configured to control navigation of the host vehicle 101, in real-time, based on the detected lane pattern displayed on the display device 115.

FIG. 3 shows a flowchart illustrating a method of detecting lane pattern in accordance with some embodiments of the present disclosure.

As illustrated in FIG. 3, the method 300 comprises one or more blocks illustrating a method of detecting lane pattern. The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the lane classification system 107, an input image from a data source 103 from one or more data sources 103. In some embodiments, the input image is a Ground Truth (GT) image comprising one or more lane markings and co-ordinates of the one or more lane markings.

At block 303, the method 300 may include dividing, by the processor 109, the input image into two portions, a first image portion and a second image portion. In some embodiments, the first image portion is divided based on the one or more lane markings and the co-ordinates of the one or more lane markings located on left side of the input image and the second image portion is divided based on the one or more lane markings and the co-ordinates of the one or more lane markings located on right side of the input image.

At block 305, the method 300 may include resizing, by the processor 109, the first image portion and the second image portion into a predefined template size. As an example, the predefined template size may be $¼^{th}$ the size of the first image portion or the second image portion.

At block 307, the method 300 may include detecting, by the processor 109, a lane pattern in at least one of the two portions by analysing each of the one or more lane markings located in the resized first image portion and the second image portion, independently, based on historical lane data. In some embodiments, the historical lane data may include, but not limited to, lane patterns detected from previous images of lanes captured in real-time by the image sensor.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present disclosure. In some embodiments, the computer system 400 can be lane classification system 107 that is used for detecting lane pattern. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with the input devices 411 and the output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more data sources 103 ($103_1$ up to $103_n$), a database 105 and a display device 115. The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for detecting lane pattern. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present disclosure are intended to be illustrative, but not limiting, of the scope of the invention, which is set forth in the following claims.

| Referral numerals | |
|---|---|
| Reference Number | Description |
| 100 | Architecture |
| 101 | Host vehicle |
| 103 | One or more data sources |
| 105 | Database |
| 107 | Lane classification system |
| 109 | Processor |
| 111 | I/O interface |
| 113 | Memory |
| 115 | Display device |
| 203 | Data |
| 205 | Modules |
| 207 | Input image data |
| 209 | Processed image data |
| 211 | Lane pattern data |
| 213 | Other data |
| 221 | Receiving module |
| 223 | Image dividing module |
| 224a | Centre point of an exemplary GT image |
| 224b and 224c | Points marking width of the first image portion and second image portion from centre point |
| 225 | Image resizing module |
| 227 | Lane classification module |
| 228a | Lane marking in first image portion |
| 228b and 228c | Lane markings in second image portion |
| 229 | Other modules |
| 400 | Exemplary computer system |
| 401 | I/O Interface of the exemplary computer system |
| 402 | Processor of the exemplary computer system |
| 403 | Network interface |

-continued

| Reference Number | Description |
| --- | --- |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

We claim:

1. A lane classification system for detecting lane pattern, the lane classification system comprising:
    an image sensor mounted to a host vehicle, to capture images of an area in front of the host vehicle;
    a processor communicatively connected to the image sensor and configured to:
    receive a plurality of training images from the image sensor, wherein each of the plurality of training images comprises one or more lane markings and co-ordinates of the one or more lane markings;
    divide each of the plurality of training image into two portions, a first image portion and a second image portion, wherein the first image portion is determined based on the one or more lane markings and the co-ordinates of the one or more lane markings located on a left side of each of the plurality of training images and the second image portion is determined based on the one or more lane markings and the co-ordinates of the one or more lane markings located on a right side of each of the plurality of training images;
    resize the first image portion and the second image portion into a predefined template size;
    train a first machine learning model using the resized first image portion of each of plurality of training images and a second machine learning model using the resized second image portion of each of plurality of training images;
    receive an input image from the image sensor and divide the input image into the first image portion of the input image and the second image portion of the input image;
    detect a lane pattern of the input image by inputting the first image portion of the input image to the first machine learning model and the second image portion of the input image to the second machine learning model; and
    control a navigation of the host vehicle based on the detected lane pattern.

2. The lane classification system as claimed in claim 1, wherein, to detect the lane pattern, the processor is further configured to:
    determine a binary value corresponding to each of the one or more lane markings located in the first image portion and the second image portion based on the plurality of training images, wherein the binary value is determined using each of the trained first and second machine learning models; and
    detect the lane pattern based on the binary value determined for each of the one or more lane markings.

3. The lane classification system as claimed in claim 2, wherein the training images are stored in a database associated with the lane classification system.

4. The lane classification system as claimed in claim 1, wherein the lane pattern comprises at least one of a solid lane or a dashed lane.

5. The lane classification system as claimed in claim 1, wherein the input image is a ground truth (GT) image that is generated from an original image using a feature extraction and prediction model.

6. An Advanced Driver-Assistance System (ADAS) comprising:
    a lane classification system;
    a display device; and
    a vehicle controlling system;
    wherein the lane classification system comprises:
    an image sensor mounted to a host vehicle; to capture images of an area in front of the host vehicle; and
    a processor communicatively connected to the image sensor and configured to:
    receive a plurality of training images from the image sensor, wherein each of the plurality of training images comprises one or more lane markings and co-ordinates of the one or more lane markings;
    divide each of the plurality of training images into two portions, a first image portion and a second image portion, wherein the first image portion is determined based on the one or more lane markings and the co-ordinates of the one or more lane markings located on a left side of each of the plurality of training images and the second image portion is determined based on the one or more lane markings and the co-ordinates of the one or more lane markings located on a right side of each of the plurality of training images;
    resize the first image portion and the second image portion into a predefined template size;
    train a first machine learning model using the resized first image portion of each of plurality of training images and a second machine learning model using the resized second image portion of each of plurality of training images;
    receive an input image from the image sensor and divide the input image into the first image portion of the input image and the second image portion of the input image; and
    detect a lane pattern of the input image by inputting the first image portion of the input image to the first machine learning model and the second image portion of the input image to the second machine learning model,
    the display device associated with the lane classification system is configured to display the detected lane pattern; and
    the vehicle controlling system associated with the lane classification system is configured to control navigation of the host vehicle, in real-time, based on the detected lane pattern.

7. A method of detecting lane pattern, the method comprising:
    receiving, by a processor communicatively connected to an image sensor mounted to a host vehicle, a plurality of training images, wherein each of the plurality of training images comprises one or more lane markings and co-ordinates of the one or more lane markings;
    dividing, using the processor, each of the plurality of training images into two portions, a first image portion and a second image portion, wherein the first image portion is determined based on the one or more lane markings and the co-ordinates of the one or more lane markings located on a left side of each of the plurality of training images and the second image portion is determined based on the one or more lane markings and the co-ordinates of the one or more lane markings located on a right side of each of the plurality of training images;

resizing, using the processor, the first image portion and the second image portion into a predefined template size;

training, using the processor, a first machine learning model using the resized first image portion of each of plurality of training images and a second machine learning model using the resized second image portion of each of plurality of training images;

receiving, using the processor, an input image from the image sensor and divide the input image into the first image portion of the input image and the second image portion of the input image;

detecting, using the processor, a lane pattern of the input image by inputting the first image portion of the input image to the first machine learning model and the second image portion of the input image to the second machine learning model; and controlling, using the processor, a navigation of the host vehicle based on the detected lane pattern.

8. The method as claimed in claim 7, wherein detecting the lane pattern further comprises:

determining, using the processor, a binary value corresponding to each of the one or more lane markings located in the first image portion and the second image portion based on the plurality of training images, wherein the binary value is determined using each of the trained first and second machine learning models; and detecting, using the processor, the lane pattern based on the binary value determined for each of the one or more lane markings.

9. The method as claimed in claim 7, wherein the training images are stored in a database associated with the lane classification system.

10. The method as claimed in claim 7, wherein the lane pattern comprises at least one of a solid lane or a dashed lane.

11. The method as claimed in claim 7, wherein the input image is a ground truth (GT) image that is generated from an original image using a feature extraction and prediction model.

\* \* \* \* \*